3,235,482
METHOD OF PREPARING FINELY-DIVIDED ASPHALTIC MATERIAL
Edwin C. Knowles, Poughkeepsie, Frederic C. McCoy, Beacon, and Harry V. Rees, Chappaqua, N.Y., assignors to Texaco Inc., New York, N.Y., a corporation of Delaware
No Drawing. Filed Mar. 26, 1962, Ser. No. 182,636
5 Claims. (Cl. 208—39)

This invention relates to a method of preparing powdered asphaltic material, and, more particularly, to a method of preparing finely-divided solid particles of asphaltic material from a solution of the material.

Asphalts occur in certain petroleum crude oils, and may be obtained therefrom as a residuum on vacuum distillation or on solvent deasphalting of the crude. The resulting asphalt obtained from the crude may be further treated as by air blowing to improve the plastic and elastic properties of the asphalt. Asphalts are generally regarded as complex systems consisting essentially of highly carbonaceous asphaltenes colloidally dispersed in a hydrocarbon oily medium, and hydrocarbon resins which act as stabilizers.

Asphalts exhibit definite plastic or flow characteristics the most important of which are penetration and softening point measured in accordance with certain empirical tests as established by the American Society for Testing Materials (ASTM). The penetration (ASTM D5-52) is determined by measuring the distance in tenths of a millimeter that a standard needle penetrates into the asphalt under controlled conditions with a definite load, e.g. 100 grams. The softening point (ASTM D36-26) is determined by filling a brass ring 5/8 inch in diameter with asphalt, placing a 3/8 inch steel ball on the asphalt, and raising the temperature uniformly until the ball drops through. Thus, the consistency for asphalts measured in terms of ASTM penetration at 77° F. with a load of 100 grams may range from about 1-3 for a very hard asphalt to about 300 for a very soft asphalt, and the softening points for asphalts may range from about 100° F. to 350° F., or higher.

Certain uses require the asphalt to be in a finely-divided state or in particulate form, which may be accomplished by attrition in conventional grinding equipment such as a ball mill. To the best of our knowledge, powdered asphalts are obtained only with very hard grades having an ASTM penetration at 77° F. of 10 or less and an ASTM softening point of above 250° F. The smallest particle size attainable for asphalt powdered by conventional methods is about 325 mesh by the U.S. Standard Sieve Series, which is equivalent to a particle diameter of about 45 microns. However, for some purposes, it is desirable or necessary to employ powdered asphalt having a smaller particle size.

This invention has therefore as its primary object to provide a method of preparing powdered asphaltic material. It is another object of the invention to provide a method of preparing finely-divided asphaltic material from a solution of the material, and subsequently contacting the solution with a dissociating liquid while under agitation thereby releasing the material in a fine powder form.

In accordance with our invention, finely-divided asphaltic material is prepared by initially dissolving the asphalt in a suitable organic liquid solvent which does not react with the asphalt. The resulting solution is contacted under agitation with a dissociating liquid in which the asphalt is relatively insoluble and which is substantially miscible with the organic liquid solvent for the asphalt. The dissociating liquid is relatively cool in comparison with the melting point of the asphalt being prepared in finely-divided form. Upon agitation, the asphalt separates from the mixture as a finely-divided material which is recovered by filtration, centrifuging, or the like.

Describing our invention in greater detail, the asphalt undergoing treatment is dissolved initially in a suitable organic liquid solvent. Although asphalts are soluble in a number of organic solvents, we have found for purposes of our invention that a limited group of solvents only are suitable. The organic liquid solvent must be miscible with the dissociating liquid employed in the process, and to render the process practical and economical, the solvent should be readily recoverable by conventional means for re-use, as will become more apparent herein below.

The organic liquid solvents are selected from the group consisting of tetrahydrofuran, pyridine and dioxane. The asphalt is dissolved in the solvent at room temperature, and the resulting solution should contain 5% to 50% by weight asphalt, and more preferably 10% to 25%. When solutions of a higher concentration than the described maximum are employed, it is exceedingly difficult to obtain a powdered product that is substantially free from solvent and therefore not soft or tacky. Moreover, this results in a loss in solvent. On the other hand, employing solutions of a lower dilution than 5% entails handling of a large quantity of solvent for the amount of product recovered and consequently is not practical.

The resulting solution is contacted under agitation with a dissociating liquid, for example water, in which the asphalt is relatively insoluble and which is substantially miscible with the organic liquid solvent. Thus, for example, the water may be agitated as the solution of material is added to the water. The water as the dissociating liquid is maintained at a relatively cool temperature, usually not less than 100° F. cooler than the softening point of the final asphaltic product prepared in powdered form, and more preferably not less than 125° F. It is advantageous to employ an excess of water in order that the solution of asphalt may be completely immersed in the aqueous mixture. Agitation as used herein and in the appended claims, is defined as violent and irregular movement whereby intimate contact between the solution of the asphalt and water occurs and discrete particles of the asphalt undergoing treatment separate. If the solution upon contact or mixing is not agitated, or if only mildly stirred, the asphaltic material undergoing treatment will agglomerate. Agitation may be satisfactorily accomplished by high speed stirring, as for example with paddle stirrers or impeller stirrers rotating at high speeds, or with a turbine mixer, mixing valve, centrifugal pump, orifice nozzle, etc. This treatment dissociates the asphaltic material into discrete particles which separate from the remaining aqueous mixture in finely-divided form, the organic solvent being dissolved by the water. The fine particles of asphalt may be separated from the remaining aqueous mixture by filtration and dried by conventional means at relatively low temperatures and in air, if desired, to recover the asphalt in powdered form.

It should be understood that although the invention has been described in more detail in connection with the use of water as the particular dissociating liquid, other liquids are satisfactory and may be employed in the process. Thus, aqueous mixtures of organic liquids, particularly the alkanols and ketones having 1 to 4 carbon atoms, for example, methanol, ethanol, propanol, isopropanol, etc. and acetone and methyl ketone may be advantageously employed. When water is employed as the dissocating liquid, tetrahydrofuran may be advantageously used as the organic liquid solvent for the asphalt. The boiling point for tetrahydrofuran is 152.6° F. which is substantially below that of water, and further tetrahydrofuran has a relatively low heat of evaporation (about 175 B.t.u. per lb.). By reason of these properties, tetrahydrofuran is readily recoverable from water for re-use in the process.

Where desired, a minor amount of a suitable surface active agent such as the sodium sulfonates may be incorporated in the solution of asphalt to be prepared in powdered form. The surface active agent facilitates separation of the finely-divided asphaltic material from the aqueous mixture, and reduces the quantity of water entrained by the recovered powdered product. The choice of surface active agent is determined largely by the materials employed in the process, and may be anionic, cationic or nonionic. About 0.1 to 0.5 percent by weight of surface active agent may be incorporated, preferably by dissolving the agent in the organic liquid solvent, but smaller or larger amounts may be used where desired.

In addition, a small amount of a micro-dimensional hydrophobic silica powder may be incorporated in the powdered product. The amount of silica powder used depends somewhat upon the consistency or hardness of the asphalt being treated, in that the harder grades would require somewhat smaller amounts of silica powder, but generally about 0.5 to 5 percent by weight is satisfactory. The silica powder facilitates the separation of the finely-divided asphaltic material from the aqueous mixture, and further assists in maintaining the powdered asphalt in a dry condition and therefore free flowing.

Where deemed desirable, finely powdered calcium silicate, which may be synthetically prepared, may be admixed with the powdered asphaltic product to maintain it in a free flowing condition. The calcium silicate should have a surface area of from about 95 to 200 square meters per gram and an ultimate particle size of 0.1 micron. Here again, the amount of calcium silicate used depends somewhat upon the consistency of the asphalt being treated, but generally about 1 to 15% by weight is satisfactory. The calcium silicate may be admixed with the powdered asphaltic material immediately upon recovery from the solution as by filtration, and the resulting admixture dried at a temperature of from about room temperature to 115° F. Other finely powdered materials which may be employed as an alternative to the calcium silicate include talc, diatomaceous earth, and bentonite.

As illustrative of the process of the present invention, the following examples are given:

Example I 5 grams of an asphalt having a penetration of 1 at 77° F. under a load of 100 grams (ASTM D5-52) and a ring and ball softening point of 265° F. (ASTM D36-26) were dissolved in 15 milliliters of tetrahydrofuran. The resulting solution was added slowly to 400 milliliters of water at 56° F. which was under vigorous agitation in a Waring Blendor operating at 10,000 r.p.m. After all the solution had been added to the water, agitation was continued for an additional 30 seconds. The aqueous mixture then was filtered, and the filtrate allowed to dry in air for 2 hours. About 5 grams of powdered asphalt having a fine particle size were recovered, and the powdered asphalt remained free flowing over a period of several weeks. Upon microscopic examination of the powdered product, it was found that the average particle size was about 50 microns and that a substantial amount of the powder was as small as 5 microns.

Example II

The procedure set forth in Example I was repeated with 5 grams of the same asphalt except that 50 milliliters of tetrahydrofuran were used for dissolving the asphalt and that the temperature of the water used in the dissociating step was 32° F. About 5 grams of powdered asphalt were recovered having an average particle size of 25 microns and a considerable portion of this material was as small as 1 micron.

We claim:

1. A method for preparing powdered asphalt consisting essentially of dissolving asphaltic material in an inorganic liquid solvent selected from the group consisting of tetrahydrofuran, pyridine and dioxane in an amount sufficient to form a resultant solution containing between 5 and 50 wt. percent asphalt, contacting the resultant solution with a volumetric excess of dissociating liquid under agitation sufficient to cause the resultant liquid phase violent and irregular motion, said dissociating liquid maintained at a temperature at least about 100° F. below that of the softening point of said asphaltic material whereby said asphaltic material separates from the resulting mixture as an asphalt powder, and recovering said asphalt powder, said dissociating liquid selected from the group consisting of water, aqueous alkanol of 1 to 4 carbons and aqueous alkanone of 1 to 4 carbons.

2. A method for preparing powdered asphalt consisting essentially of dissolving asphaltic material in tetrahydrofuran in an amount sufficient to form a resultant solvent solution containing from 10 to 25 wt. percent asphalt, contacting said resulting solution with a volumetric excess of water maintained at a temperature of at least 125° F. below that of the softening point of said asphaltic material under agitation conditions sufficient to cause violent and irregular movement of the resultant liquid phase, whereby said asphaltic materials separate from the resulting mixture as an asphalt powder.

3. A method in accordance with claim 2 wherein hydrophobic silica powder is admixed with said asphalt powder and the resultant composition is recovered.

4. A method according to claim 1 wherein said finely-divided material is admixed with a hydrophobic silica powder.

5. A method according to claim 1 wherein said finely-divided material is admixed with calcium silicate.

References Cited by the Examiner

UNITED STATES PATENTS

| | | | |
|---|---|---|---|
| 1,868,211 | 7/1932 | Nobel | 208—39 |
| 2,045,906 | 6/1936 | Gardner et al. | 186—281 |
| 2,196,989 | 4/1940 | Henry et al. | 208—45 |
| 2,300,119 | 10/1942 | Holmes | 208—45 |

DELBERT E. GANTZ, *Primary Examiner.*

ALPHONSO D. SULLIVAN, *Examiner.*